UNITED STATES PATENT OFFICE.

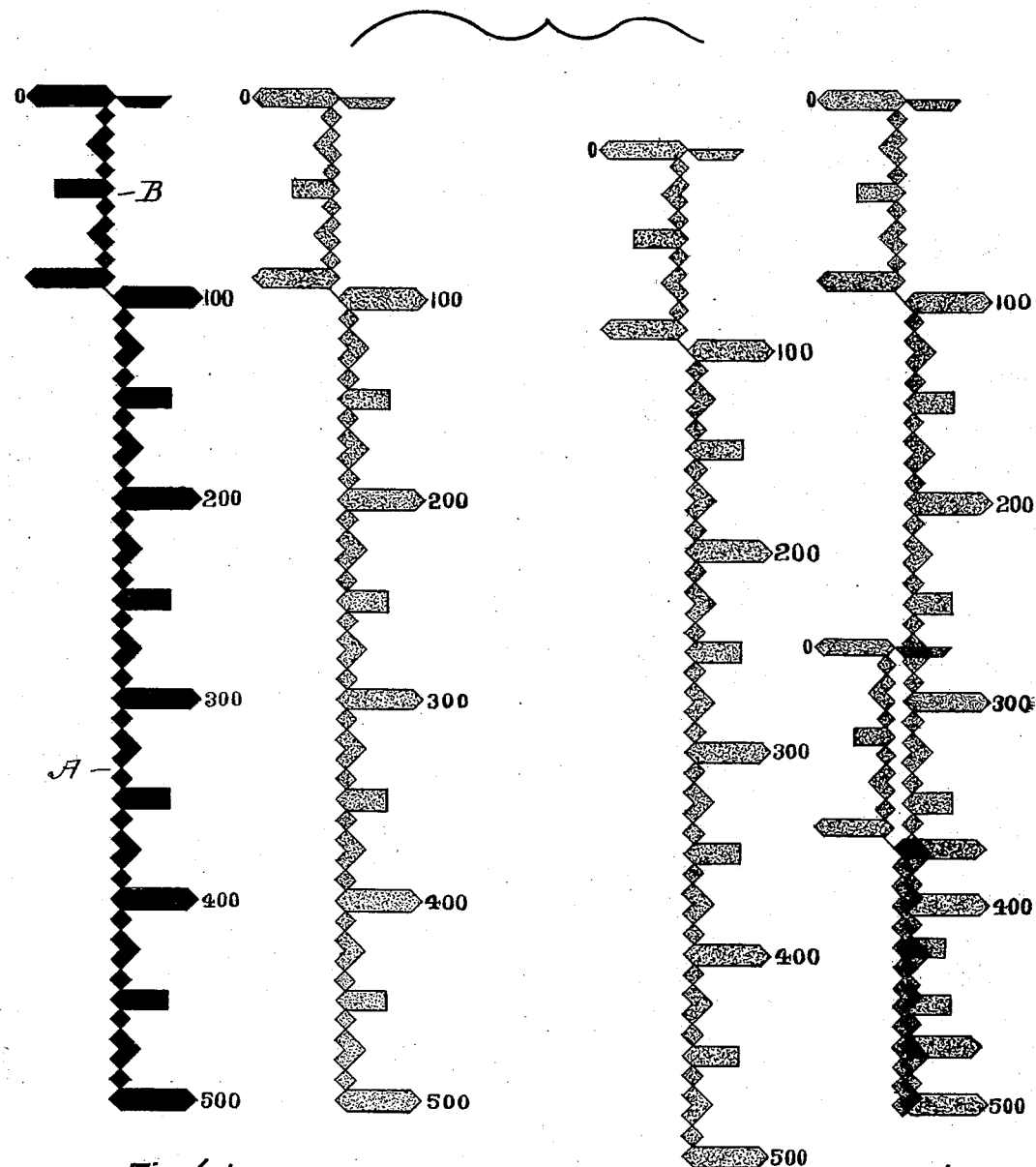

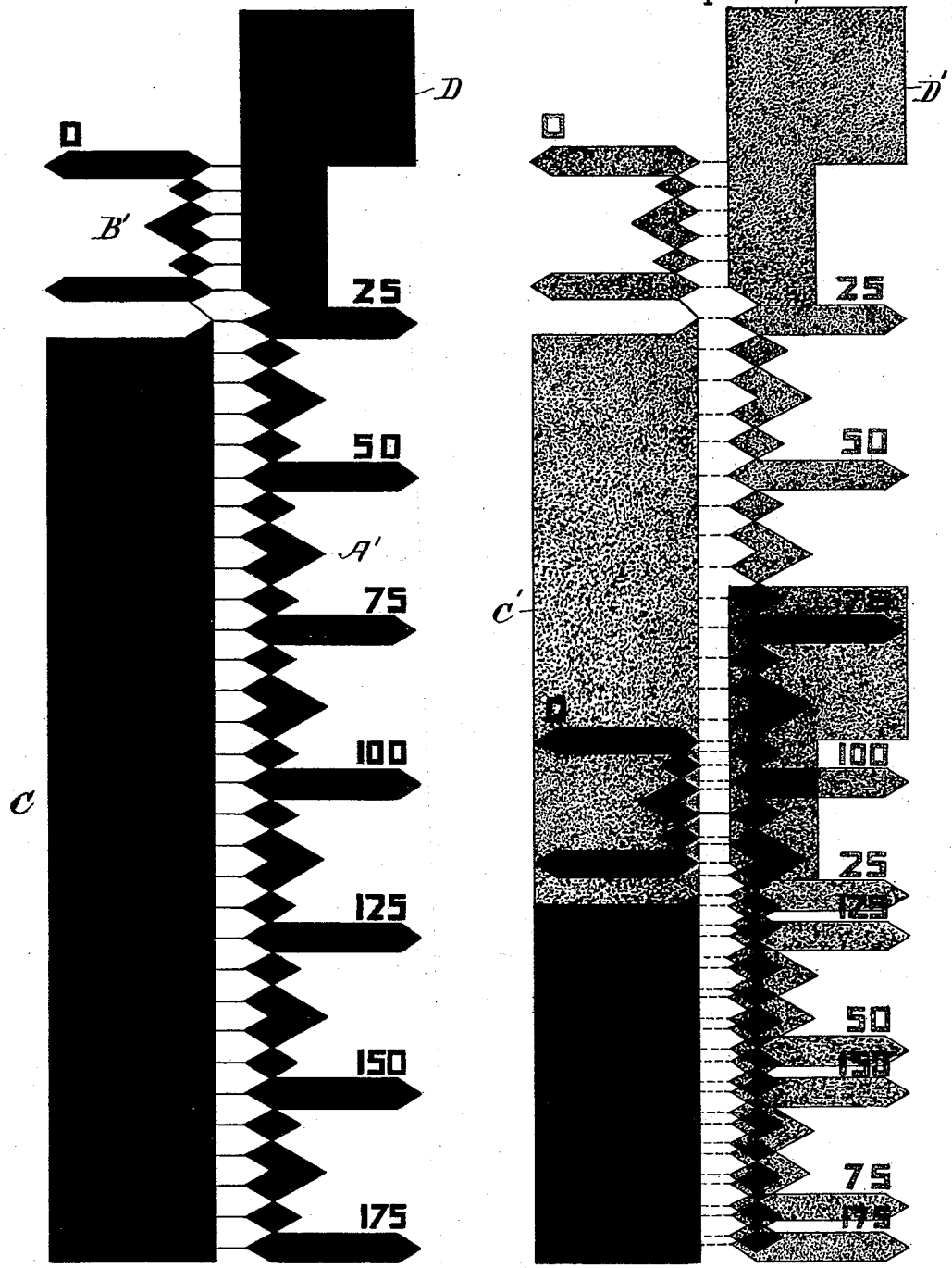

ROBERT H. RICHARDS, OF BOSTON, MASSACHUSETTS.

STADIA-ROD.

SPECIFICATION forming part of Letters Patent No. 495,232, dated April 11, 1893.

Application filed April 27, 1892. Serial No. 430,841. (No model.)

*To all whom it may concern:*

Be it known that I, ROBERT H. RICHARDS, a citizen of the United States, residing at Boston, in the county of Suffolk and State of Massachusetts, have invented an Improved Stadia-Rod, of which the following is a specification.

My invention relates to that class of surveying instruments known as stadia rods or telemeter rods, and its object is to improve their graduation in such a way that distances may be determined with increased accuracy by the use of optical vernier reading, as hereinafter more fully explained.

My invention relates mainly to a novel form of graduation of the rod, whereby in connection with the telescope or distance measuring instrument described by me in my application for patent No. 398,999, the distance of the rod from the observer may be measured by means of what I call an optical vernier, thereby increasing the accuracy of the reading.

In my improved telescope I have a portion of the objective exposed and another portion covered by a prism of known angle, whereby are obtained two images, one by the direct ray through the uncovered portion of the objective and the other by the ray bent by the prism. Upon observing by means of this telescope a graduated rod of any construction, two images of the graduation may be obtained, one of which by revolving the telescope, may be brought into line with the other, but they will not be coincident, owing to the divergence of one by the bent ray. The amount of this divergence may be then read upon the scale, and the distance of the rod from the observer may be thus determined, the amount of divergence being proportionate thereto.

To apply the vernier principle to this method of measuring is the object of my present invention, and in the accompanying drawings I have represented at Figures 1, 2 and 3 a rod having a graduation in which my present improvement is embodied, and at Figs. 4 and 5 a modification thereof.

In the drawings, as will be observed, the graduation shown is decimal, and in connection with this graduation and as a continuation thereof, I provide a vernier graduation, shown in the drawings at B and B'.

At Fig. 2 I have shown the two images of the graduation, before bringing them into line, and at Fig. 3 the same two images when brought into line, so that the amount of divergence between them may be read upon the graduation with vernier accuracy.

At Figs. 4 and 5 I have shown a modification of the graduation and vernier, which I will hereinafter more fully explain.

If the graduation be observed at a distance through a telescope embodying my improvement as described, one image of it will be obtained directly through the uncovered portion of the objective, and a second image of it will be obtained by the bent ray coming through the prism. Then by turning the telescope these two images may be brought into line (see Fig. 3) and then by reading the amount of the divergence of the two, and noting the point of coincidence of the vernier and decimal graduations, the distance of the rod from the observer, may be determined with great accuracy without the use of cross-hairs and with the consequent elimination of one personal error of reading. In the drawings, for example, the zero of one image is a little below the seventh graduation below the two-hundred mark, and the point of the vernier in coincidence is the third below the zero, thus indicating that the rod is distant from the observer two hundred and seventy-three feet, or such a multiple thereof as may be indicated by having the successive degrees of graduation represent more than one foot each.

In the drawings I have represented the apparent images of the graduation at Figs. 2, 3 and 5, somewhat lighter in color than the graduation on the rod, such being the actual appearance.

In Figs. 4 and 5 is shown a graduation A', B', of the same general character as that before described, but with the improvement or additional feature of the blackened parts C, D. The object of these additional parts is to insure the superposition of two gray images, and thereby obtain black images of the graduations A', B' where they meet, so that the reading upon the scale shall be clearly seen. Thus the additional black part C makes a continuous gray image C', upon which the image of the vernier scale B' wherever superposed, will always show black. Similarly the black part D makes a gray image D' upon which the image of that part of the graduation A where the reading occurs will likewise show black. As shown in the drawings the reading of Fig. 5 is 75+15+3=93 feet.

I am aware that a stadia rod has long been in use wherein a vernier reading has been obtained by mechanically and actually moving a portion of a vernier graduation past a portion having a plain graduation, and I lay no claim thereto, the novelty of my invention lying, as I believe, in the use of a vernier, the image of which is moved optically to obtain the vernier reading.

I claim—

1. A stadia rod having a main graduation and a vernier forming a continuation of the said main graduation, for the purpose set forth.

2. A stadia rod having a main graduation and a vernier forming a continuation of the said main graduation, the said rod being also provided with the additional marks or portions C, D, for the purpose set forth.

In testimony whereof I have hereunto subscribed my name this 23d day of April, A. D. 1892.

ROBERT H. RICHARDS.

Witnesses:
JOHN H. TAYLOR,
ELLEN B. TOMLINSON.